US011512573B2

(12) United States Patent
Le Calvez et al.

(10) Patent No.: US 11,512,573 B2
(45) Date of Patent: Nov. 29, 2022

(54) STIMULATION USING FIBER-DERIVED INFORMATION AND FRACTURING MODELING

(71) Applicant: SCHLUMBERGER TECHNOLOGY CORPORATION, Sugar Land, TX (US)

(72) Inventors: Joel Le Calvez, Orsay (FR); David Sobernheim, Sr., Greenwood Village, CO (US)

(73) Assignee: Schlumberger Technology Corporation, Sugar Land, TX (US)

(*) Notice: Subject to any disclaimer, the term of this patent is extended or adjusted under 35 U.S.C. 154(b) by 562 days.

(21) Appl. No.: 16/334,736

(22) PCT Filed: Oct. 17, 2016

(86) PCT No.: PCT/US2016/057309
§ 371 (c)(1),
(2) Date: Mar. 19, 2019

(87) PCT Pub. No.: WO2018/074989
PCT Pub. Date: Apr. 26, 2018

(65) Prior Publication Data
US 2019/0242233 A1 Aug. 8, 2019

(51) Int. Cl.
*E21B 43/267* (2006.01)
*E21B 47/09* (2012.01)
(Continued)

(52) U.S. Cl.
CPC ............ *E21B 43/267* (2013.01); *E21B 43/26* (2013.01); *E21B 47/09* (2013.01); *E21B 47/135* (2020.05);
(Continued)

(58) Field of Classification Search
CPC ...... E21B 43/267; E21B 47/135; E21B 43/26; E21B 47/09; G02B 6/4415; G01V 99/005; G01V 8/16; G06F 9/455
(Continued)

(56) References Cited

U.S. PATENT DOCUMENTS

| 8,950,482 B2* | 2/2015 | Hill | E21B 47/135 |
| | | | 166/308.1 |
| 10,444,388 B2* | 10/2019 | Dusterhoft | G01V 1/301 |

(Continued)

FOREIGN PATENT DOCUMENTS

WO 2015/187142 A1 12/2015

OTHER PUBLICATIONS

Spain, David R., et al. "Geo-engineered completion optimization: an integrated, multi-disciplinary approach to improve stimulation efficiency in unconventional shale reservoirs." SPE Middle East Unconventional Resources Conference and Exhibition. Society of Petroleum Engineers, 2015. pp. 1-12. (Year: 2015).*

(Continued)

*Primary Examiner* — John E Johansen

(57) ABSTRACT

A method for performing a fracturing operation in a subterranean formation of a field. The method includes obtaining, during the fracturing operation, distributed optical fiber data from a downhole sensor of a treatment well in the subterranean formation, and determining, based on the distributed optical fiber data, an active perforation location from a number of pre-determined perforation locations of the treatment well. The active perforation location is a location of fluid flow into the subterranean formation during the fracturing operation. The method further includes generating, based at least on the active perforation location, a fracturing model for the subterranean formation, and performing, (Continued)

based on the fracturing model, modeling of the fracturing operation to generate a modeling result.

10 Claims, 9 Drawing Sheets

(51) Int. Cl.
| | |
|---|---|
| G02B 6/44 | (2006.01) |
| G01V 99/00 | (2009.01) |
| G01V 8/16 | (2006.01) |
| E21B 47/135 | (2012.01) |
| E21B 43/26 | (2006.01) |
| G06F 9/455 | (2018.01) |

(52) U.S. Cl.
CPC .............. *G01V 8/16* (2013.01); *G01V 99/005* (2013.01); *G02B 6/4415* (2013.01); *G06F 9/455* (2013.01)

(58) Field of Classification Search
USPC .......................................................... 703/10
See application file for complete search history.

(56) References Cited

U.S. PATENT DOCUMENTS

| | | |
|---|---|---|
| 2006/0272809 A1 | 12/2006 | Tubel et al. |
| 2009/0182509 A1 | 7/2009 | Kimninau et al. |
| 2014/0182841 A1* | 7/2014 | Lecerf .................... E21B 43/26 166/250.01 |
| 2014/0290936 A1 | 10/2014 | Wills et al. |
| 2016/0040514 A1 | 2/2016 | Rahmani et al. |
| 2018/0217285 A1* | 8/2018 | Walters .................... G01V 1/42 |

OTHER PUBLICATIONS

Le Calvez, et al., "Tool and Velocity Model Calibration for Downhole-Based Hydraulic Fracture Monitoring of Induced Microseismicity," Society of Exploration Geophysicists Annual Conference and Exhibition, 2013.

International Search Report and Written Opinion for the equivalent International patent application PCT/US2016/057309 dated Jun. 23, 2017.

International Preliminary Report on Patentability for the equivalent International patent application PCT/US2016/057309 dated May 2, 2019.

* cited by examiner

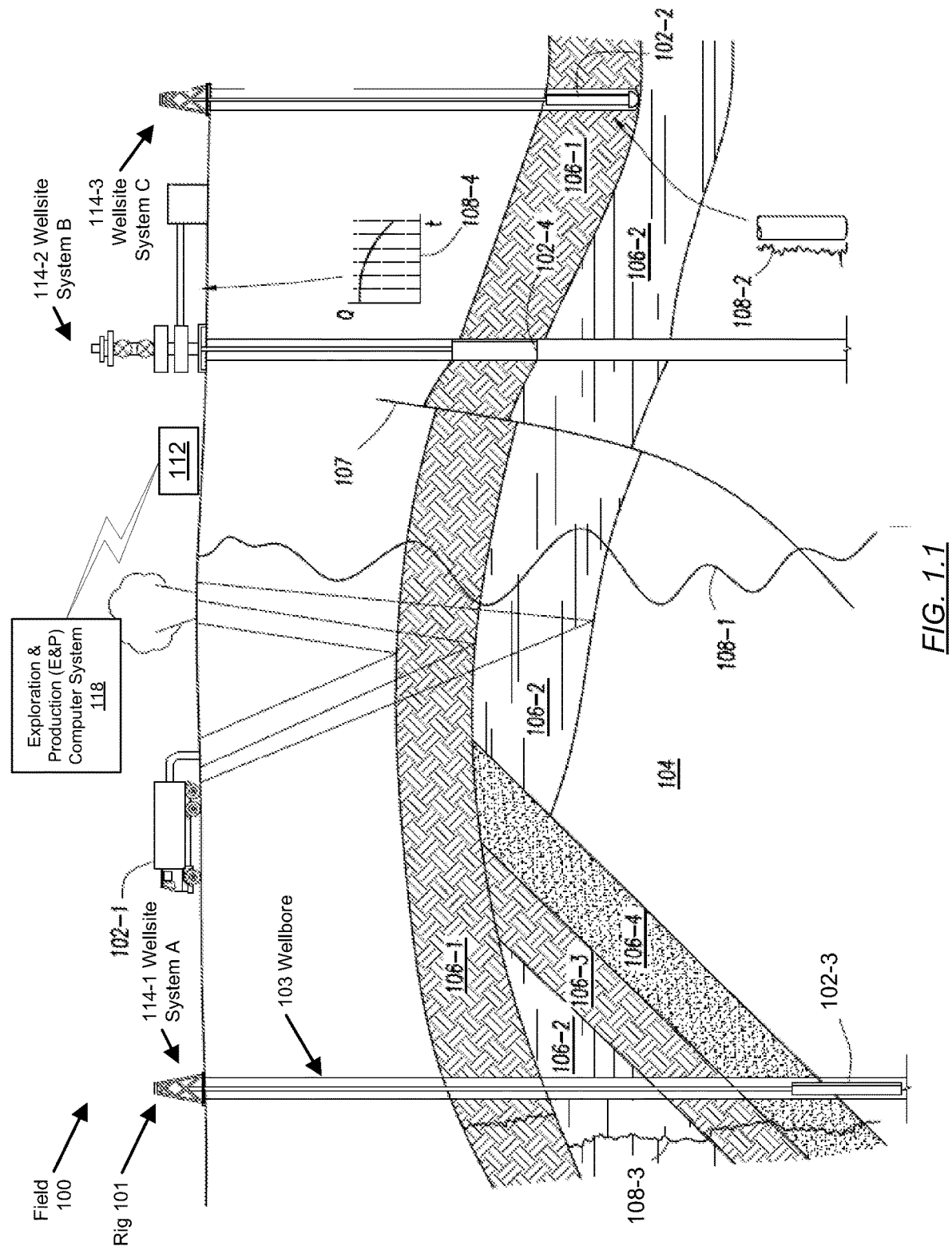
FIG. 1.1

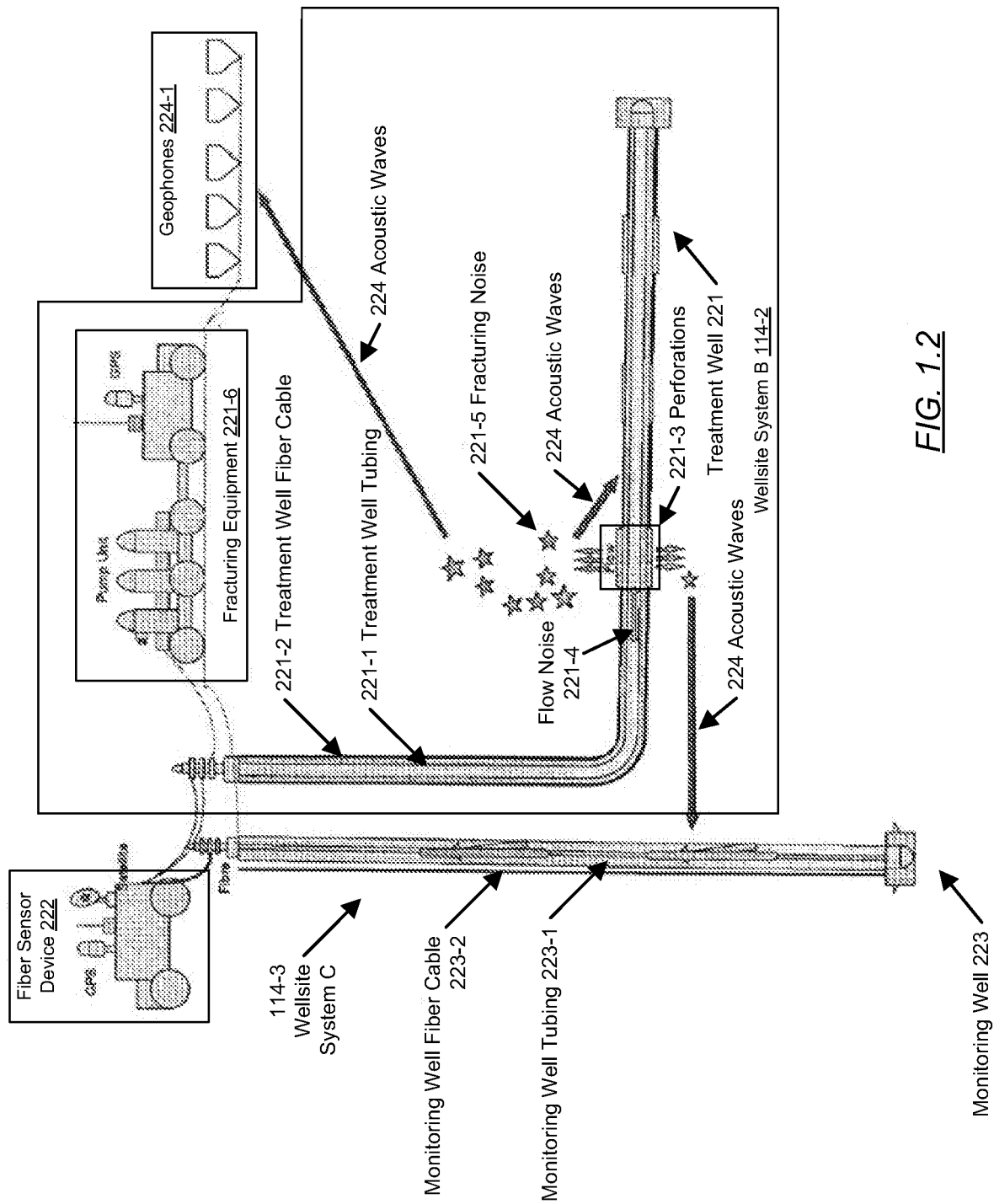
FIG. 1.2

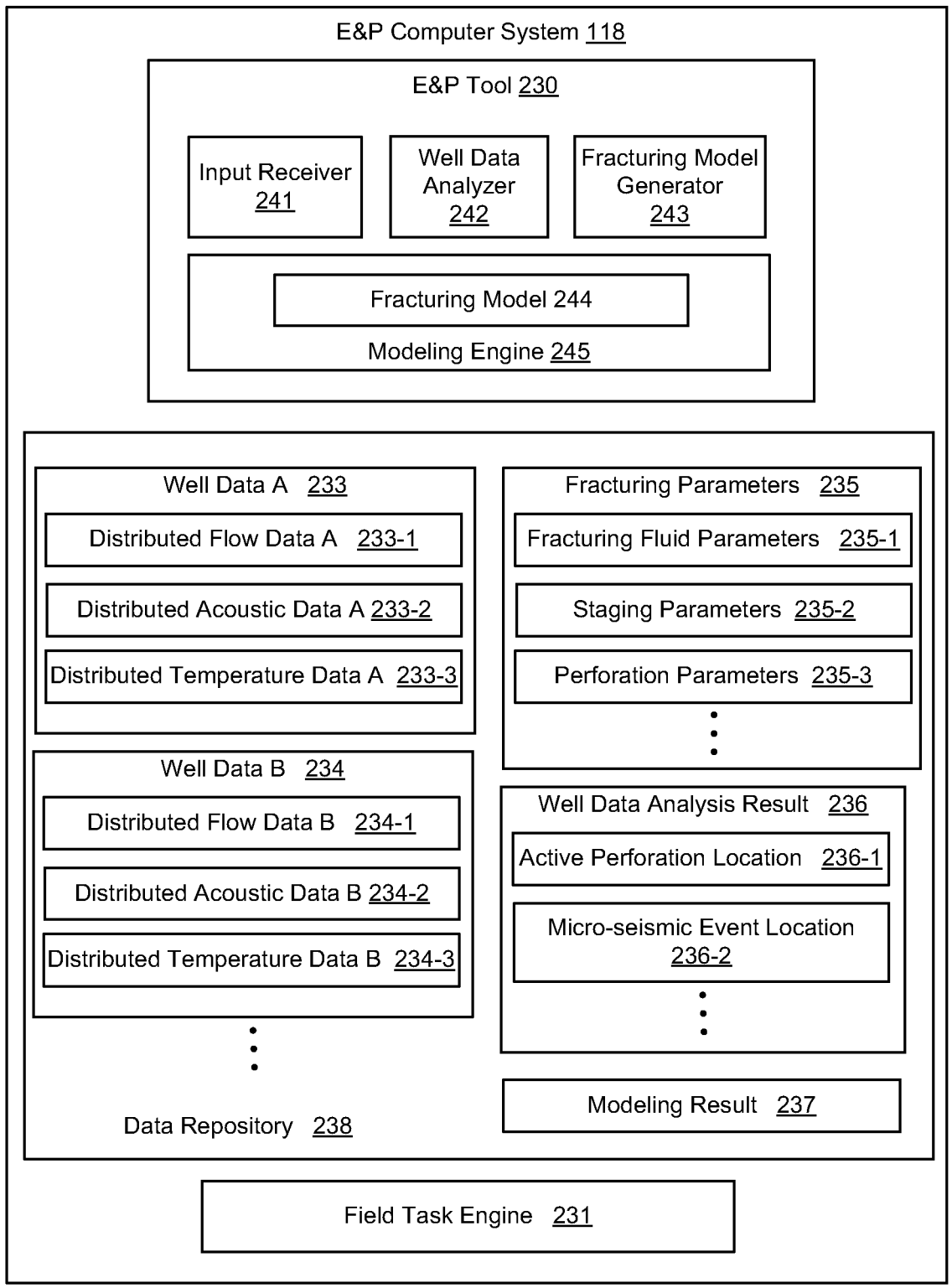
FIG. 1.3

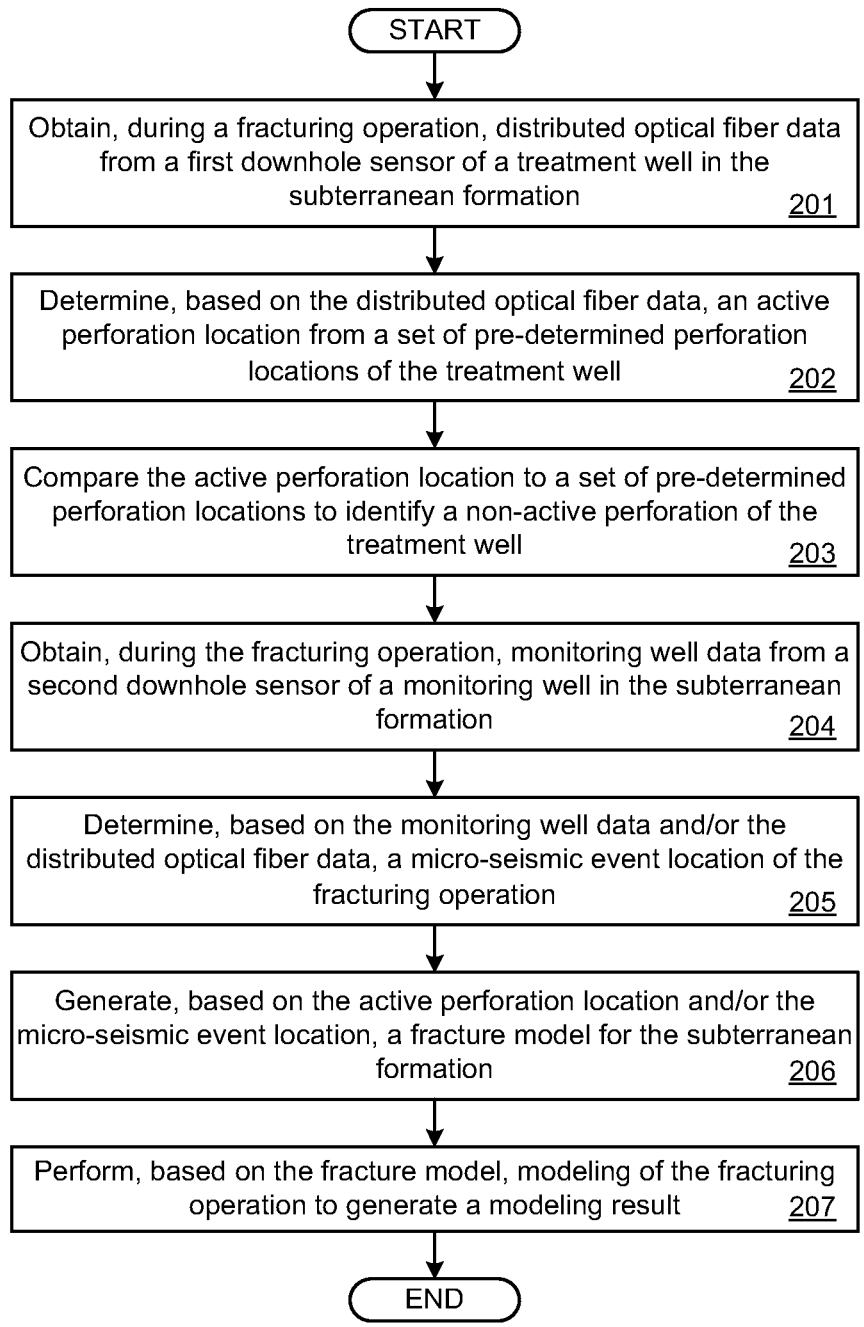
FIG. 2.1

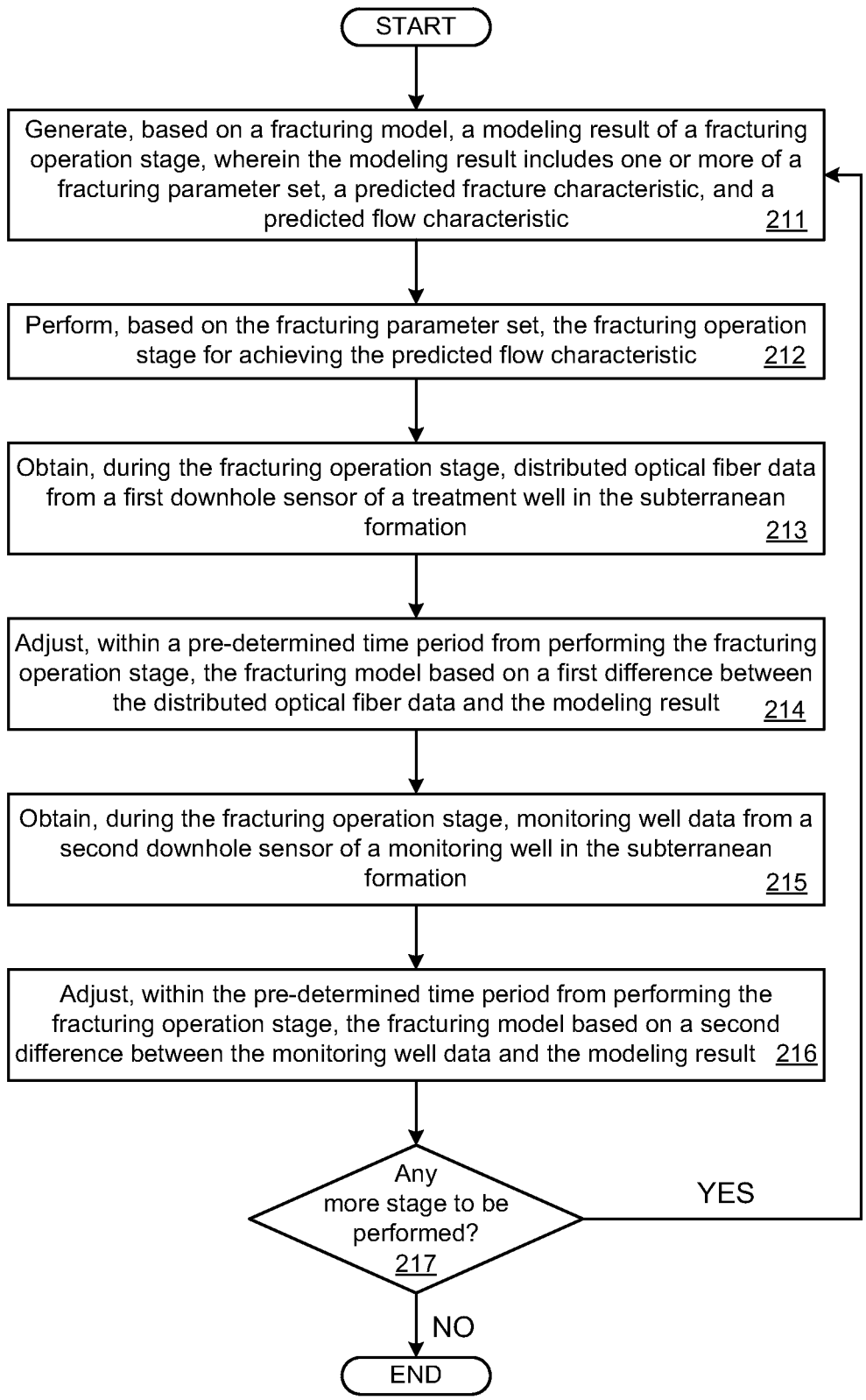
FIG. 2.2

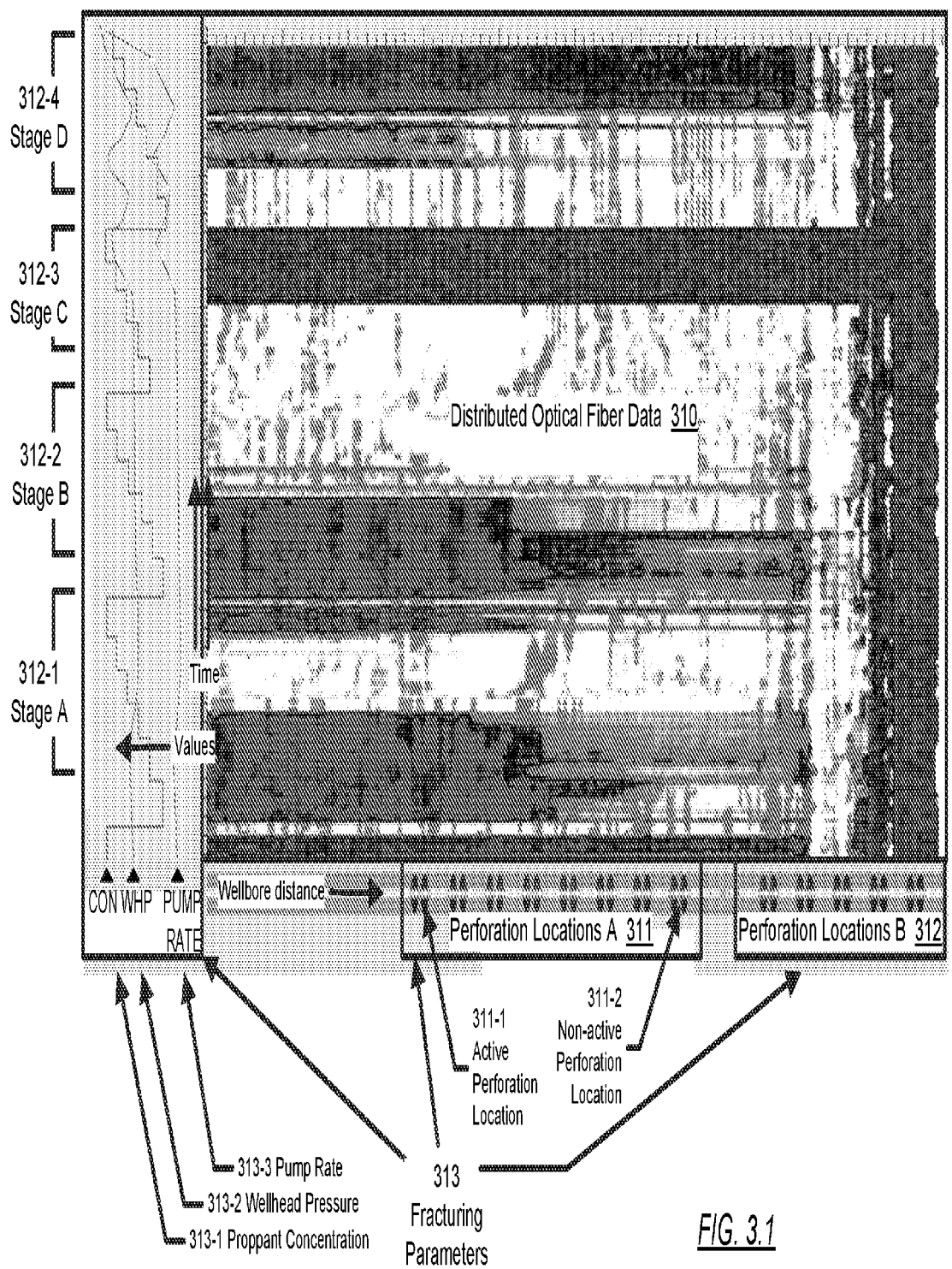
FIG. 3.1

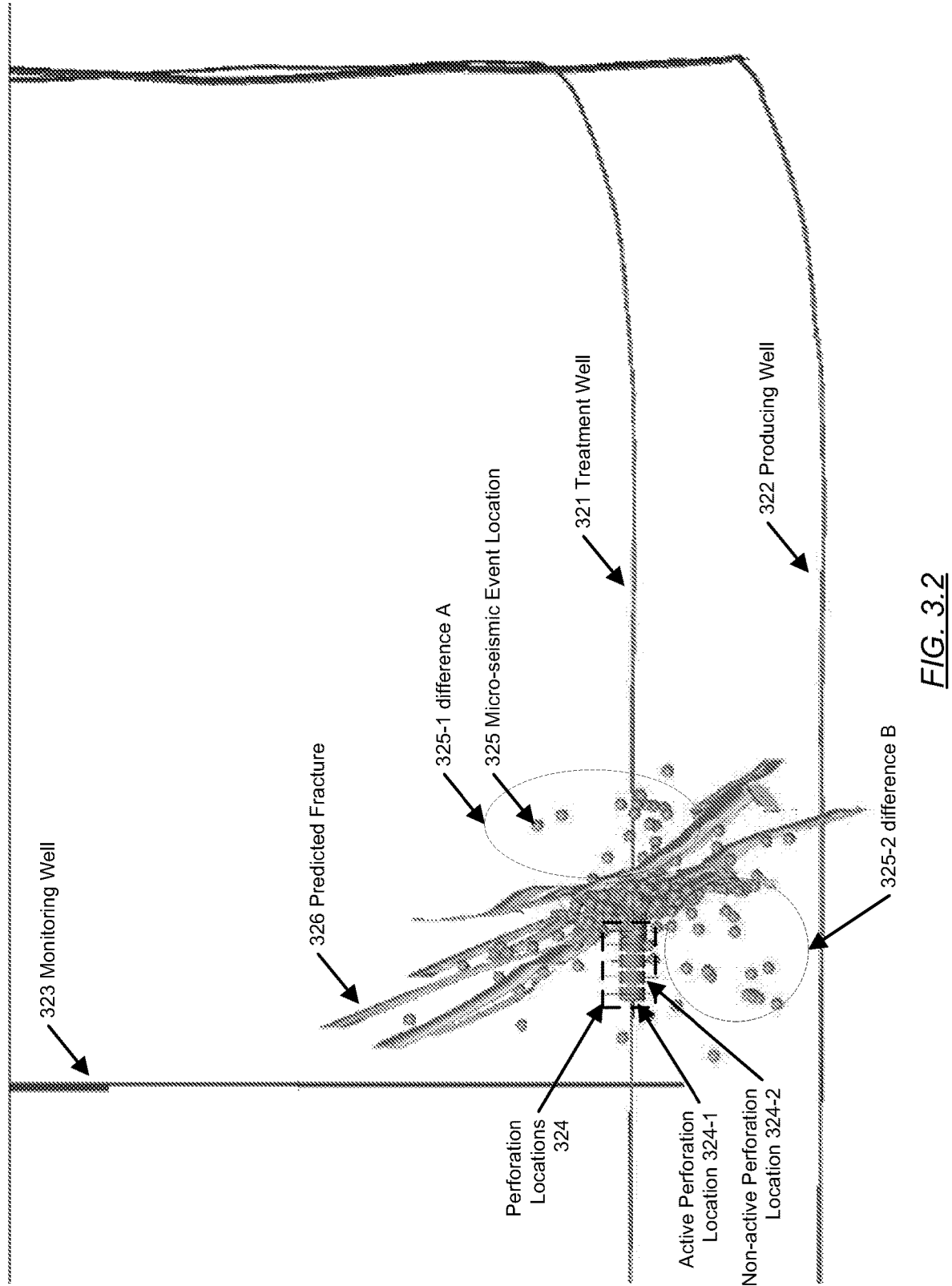
FIG. 3.2

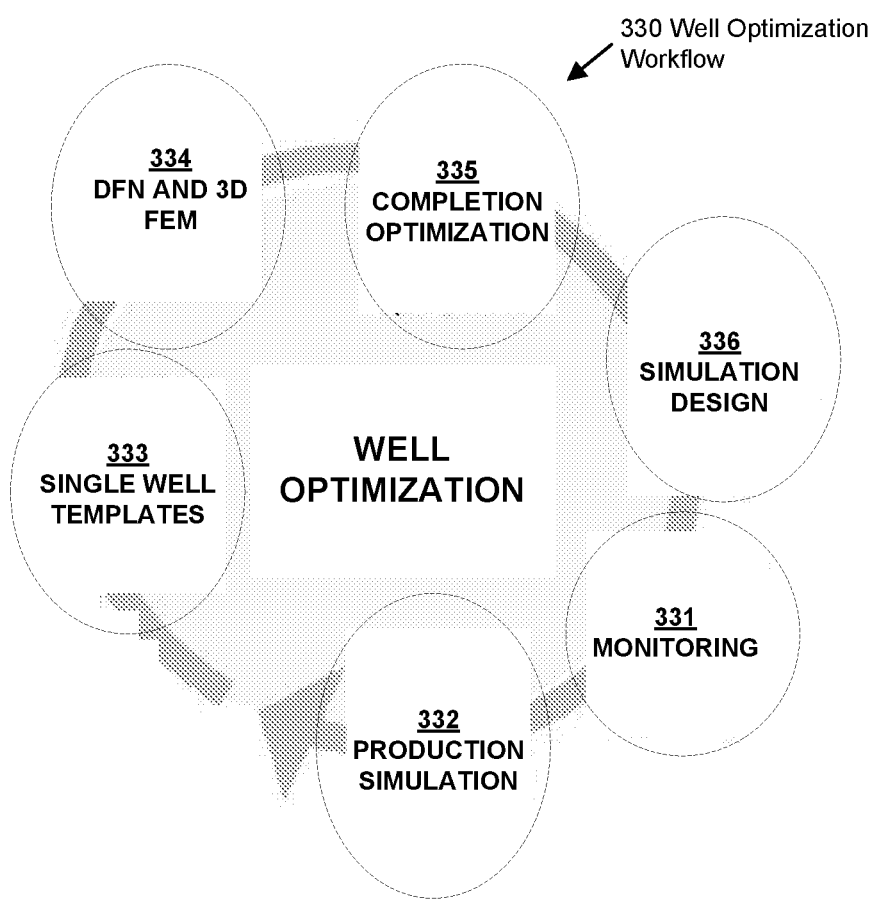
FIG. 3.3

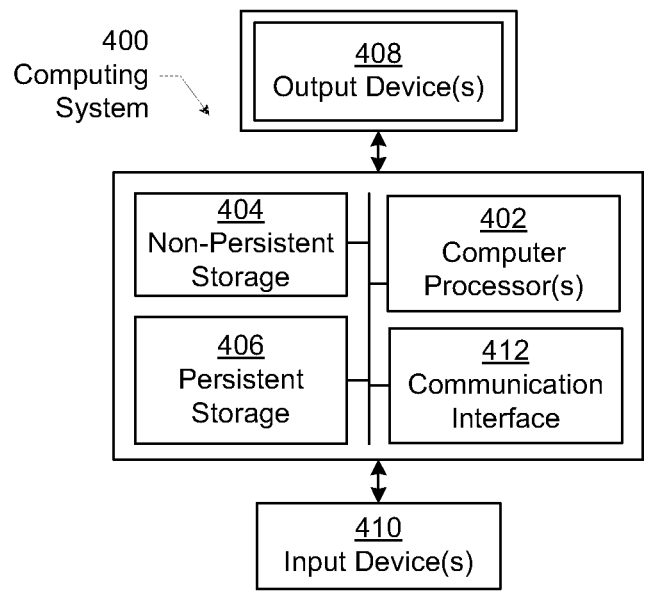
*FIG. 4.1*
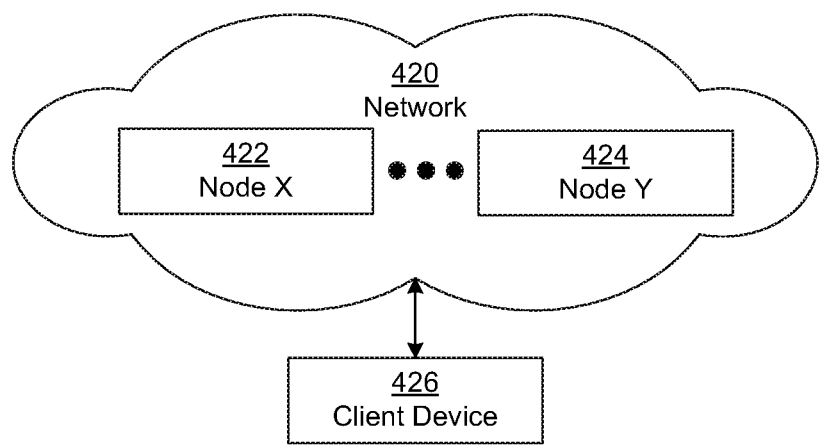
*FIG. 4.2*

STIMULATION USING FIBER-DERIVED INFORMATION AND FRACTURING MODELING

BACKGROUND

Hydraulic fracturing (also referred to as fracturing or fracturing operation) is a stimulation operation to crack subterranean formation rocks by a pressurized fluid that is injected from perforations of a wellbore. For example, the pressurized fluid may include water or steam containing sand or other proppants suspended with or without the aid of thickening agents. The pressurized liquid creates cracks in the rocks (i.e., hydraulic fractures) through which hydrocarbons (e.g., natural gas, petroleum) and/or other subterranean fluids (e.g., brine) flows more freely. When the hydraulic pressure is removed from the wellbore, small grains of hydraulic fracturing proppants (e.g., sand or aluminum oxide) hold the fractures open. The hydraulic fracturing may be performed in stages (i.e., fracturing operation stages) defined by respective wellbore sections, durations, and fluid injection parameters. Subsequent to the hydraulic fracturing or a stage of the hydraulic fracturing, one or more production flow characteristics (i.e., flow rate of the hydrocarbons (e.g., natural gas, petroleum) and/or other subterranean fluids (e.g., brine) extracted through a producing well are improved (e.g., increased flow rate) due to the improved fluid free flow through the fractures.

SUMMARY

In general, in one aspect, improved stimulation using fiber-derived information and fracturing modeling relates to a method for performing a fracturing operation in a subterranean formation of a field. The method includes obtaining, during the fracturing operation, distributed optical fiber data from a first downhole sensor of a treatment well in the subterranean formation, and determining, based on the distributed optical fiber data, an active perforation location from a plurality of pre-determined perforation locations of the treatment well. The active perforation location is a first location of fluid flow into the subterranean formation during the fracturing operation. The method further includes generating, based at least on the active perforation location, a fracturing model for the subterranean formation, and performing, based on the fracturing model, modeling of the fracturing operation to generate a modeling result.

In general, in one aspect, improved stimulation using fiber-derived information and fracturing modeling relates to a method for performing a fracturing operation in a subterranean formation of a field. The method includes generating, based on a first fracture model, a first modeling result of a first stage of the fracturing operation. The first modeling result comprises a first fracturing parameter set and a first predicted flow characteristic. The first fracturing parameter set is used during a first stage of the fracturing operation for achieving the first predicted flow characteristic. The method further includes obtaining, during the first stage of the fracturing operation, distributed optical fiber data from a first downhole sensor of a treatment well in the subterranean formation, adjusting the first fracture model to generate a second fracture model based on a first difference between the distributed optical fiber data and the first predicted flow characteristic, and generating, based on the second fracture model and within a pre-determined time period from the first stage, a second modeling result of a second stage of the fracturing operation. The second modeling result includes a second fracturing parameter set and a second predicted flow characteristic. The second fracturing parameter set is used during a second stage of the fracturing operation for achieving the second predicted flow characteristic.

Other aspects will be apparent from the following description and the appended claims.

BRIEF DESCRIPTION OF DRAWINGS

The appended drawings illustrate several embodiments of improved stimulation using real-time fiber-derived information and fracturing modeling and are not to be considered limiting of its scope, for improved stimulation using real-time fiber-derived information and fracturing modeling may admit to other equally effective embodiments.

FIG. 1.1 is a schematic view, partially in cross-section, of a field in which one or more embodiments of improved stimulation using real-time fiber-derived information and fracturing modeling may be implemented.

FIGS. 1.2 and 1.3 show a schematic view and a schematic diagram, respectively, of a system in accordance with one or more embodiments.

FIGS. 2.1 and 2.2 show a flowchart in accordance with one or more embodiments.

FIGS. 3.1, 3.2, and 3.3 show an example in accordance with one or more embodiments.

FIGS. 4.1 and 4.2 show systems in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing a fracturing operation based on real-time calibrated modeling results. During the fracturing operation, distributed optical fiber data is obtained from a downhole sensor of a treatment well and/or monitoring well in the subterranean formation. Based on the distributed optical fiber data, active and inactive perforation locations as well as micro-seismic event locations are determined. Based at least on the active/inactive perforation locations and/or the micro-seismic event locations, a fracturing model for the subterranean formation is generated and calibrated. Accordingly, based on the fracturing model, modeling of the fracturing operation is performed to generate a real-time calibrated modeling result.

FIG. 1.1 depicts a schematic view, partially in cross section, of a field (100) in which one or more embodiments of improved stimulation using real-time fiber-derived information and fracturing modeling may be implemented. In one or more embodiments, one or more of the modules and elements shown in FIG. 1.1 may be omitted, repeated, and/or substituted. Accordingly, embodiments of improved stimulation using real-time fiber-derived information and fracturing modeling should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). In particular, these geological structures form at least one reservoir containing fluids, such as hydrocarbon.

In one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, other measurement data (e.g., DAS measurement data), or and other parameters of interest.

Further, as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, and other wellsite equipment, such as fracturing equipment, production equipment, and logging equipment to perform fracturing operations, production operations, and logging operations, respectively. Generally, survey operations and wellbore operations are referred to as field operations of the field (100). In addition, data acquisition tools (102-1), (102-2), (102-3), (102-4) and wellsite equipment are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionality for actuating mechanisms (e.g., of the fracturing equipment, production equipment, logging equipment, etc.) at the field (100). The surface unit (112) may then send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of fracturing operations and/or production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

FIG. 1.2 shows an example of the wellsite system B (114-2) and wellsite system C (114-3) in which one or more embodiments of improved stimulation using real-time fiber-derived information and fracturing modeling may be implemented. In one or more embodiments, one or more of the modules and elements shown in FIG. 1.2 may be omitted, repeated, and/or substituted. Accordingly, embodiments of improved stimulation using real-time fiber-derived information and fracturing modeling should not be considered limited to the specific arrangements of modules shown in FIG. 1.2.

As shown in FIG. 1.2, the wellsite system B (114-2) includes fracturing equipment (221-6) associated with a treatment well (221) having a treatment well tubing (221-1) and a treatment well fiber cable (221-2). As used herein, the term "treatment well" refers to a well that is used to inject fracturing fluid during the fracturing operation. The treatment well may also be referred to as an injection well. The fracturing equipment (221-6) is configured to pump pressurized liquid (referred to as the fracturing fluid) into the treatment well tubing (221-1). Accordingly, the fracturing fluid is injected into a surrounding rock formation through the perforations (221-3) of the treatment well tubing (221-1). For example, the fracturing equipment (221-6) may include a fracturing truck equipped with a pump and a global positioning system (GPS). The perforations (221-3) are a set of holes formed in the casing or liner of the treatment well tubing (221-1) for injecting the fracturing fluid. An open hole in the perforations (221-3) that is capable of injecting the fracture fluid is referred to as an active perforation. In contrast, a completely or partially plugged hole, if any, in the perforations (221-3) is referred to as an inactive perforation. The treatment well fiber cable (221-2) is an optical fiber deployed in the treatment well (221) and serving as a fiber sensor for generating, collectively with the fiber sensor device (222), distributed optical fiber data of the treatment well (221). The fiber sensor may include a distributed acoustic sensor (DAS), distributed temperature sensor (DTS), and heterodyne Distributed Vibration Sensor (hDVS) that use fiber optic cables to provide distributed measurements, such as acoustic measurements, temperature measurements, flow measurements, etc. In particular, the optical fiber cable acts as the sensing element (i.e., fiber sensor) for an attached optoelectronic device (i.e., fiber sensor device (222)) to perform, and in part process, the measurements over large distances and in harsh environments. The acoustic measurements, temperature measurements, flow measurements, etc. include location-dependent measured values and are referred to as distributed optical fiber data.

The fiber sensor device (222) may be deployed on a recording truck that is equipped with a GPS and satellite communication equipment. The treatment well fiber cable (221-2) may be deployed inside the wellbore formed by the treatment well tubing (221-1). In one or more embodiments, the distributed optical fiber data of the treatment well (221) is transmitted by the fiber sensor device (222) to the surface unit (112) depicted in FIG. 1.1 above.

Further, as shown in FIG. 1.2, the wellsite system C (114-3) includes a monitoring well (223) having a monitoring well tubing (223-1) and a monitoring well fiber cable (223-2). As used herein, the term "monitoring well" refers to a well equipped with sensors to monitor the fracturing operation. A monitoring well may be a producing well or a dedicated monitoring well not involved in any subterranean fluids extraction. As used herein, the term "producing well" refers to a well for extracting subterranean fluids, in particular a well that is anticipated to have improved production flow characteristics as a result of the fracturing operation. The monitoring well fiber cable (223-2) is an optical fiber deployed in the monitoring well (223) and serving as a fiber sensor for generating, collectively with the fiber sensor device (222), distributed optical fiber data of the monitoring well (223). The monitoring well fiber cable (223-2) may be deployed inside the wellbore formed by the monitoring well tubing (223-1) In one or more embodiments, the distributed optical fiber data of the monitoring well (223) is transmitted by the fiber sensor device (222) to the surface unit (112) depicted in FIG. 1.1 above.

During the fracturing operation, pressurized fluid flows through the wellbore formed by the treatment well tubing (221-1) and creates flow noises (e.g., flow noise (221-4)) throughout the extent of the wellbore. The surrounding rock formation is cracked (i.e., hydraulically fractured) by the pressurized fluid injected from the perforations (221-3), resulting in micro-seismic events that are denoted as star-shaped icons in FIG. 1.2. A seismic event is breaking of the subterranean rock formation that creates seismic waves. A micro-seismic event is a low level (e.g., less than 2.0 in the Richter scale) seismic event. Thus, a micro-seismic event may be indicative of a fracture being induced. In particular, each star-shaped icon identifies a location of a micro-seismic event and is associated with a fracturing noise (e.g., fracturing noise (221-5)). The location of a micro-seismic event is referred to as a micro-seismic event location, which may be a hypocenter of the low level seismic event. The hypocenter may be determined with a given range (e.g., an ellipsoid) of uncertainty.

The fracturing noises of the micro-seismic events cause acoustic waves (224) that propagate in various directions through the surrounding rock formations and are sensed by the treatment well fiber cable (221-2), the monitoring fiber cable (223-2), and the geophones (224-1). In one or more embodiments, the distributed optical fiber data sensed/generated by the treatment well fiber cable (221-2) and/or the monitoring fiber cable (223-2) includes a flow noise component and a fracturing noise component. In other words, a portion of the distributed optical fiber data corresponds to the flow noise while another portion of the distributed optical fiber data corresponds to the fracturing noise.

Although the treatment well fiber cable (221-2) and the monitoring well fiber cable (223-2) are shown as connecting to the same fiber sensor device (i.e., fiber sensor device (222)), in one or more embodiments, the treatment well fiber cable (221-2) and the monitoring well fiber cable (223-2) may also connect to different fiber sensor devices.

In one or more embodiments, the treatment well (221) is used to inject the fracturing fluid for creating and/or enlarging the fractures in the subterranean formation to increase one or more production flow characteristics (e.g., production flow rate) of one or more producing wells. In one or more embodiments, the one or more producing wells include the monitoring well (223). In one or more embodiments, the one or more producing wells are separate from the monitoring well (223).

FIG. 1.3 shows more details of the E&P computer system (118) in which one or more embodiments of improved stimulation using real-time fiber-derived information and fracturing modeling may be implemented. In one or more embodiments, one or more of the modules and elements shown in FIG. 1.3 may be omitted, repeated, and/or substituted. Accordingly, embodiments of improved stimulation using real-time fiber-derived information and fracturing modeling should not be considered limited to the specific arrangements of modules shown in FIG. 1.3.

As shown in FIG. 1.3, the E&P computer system (118) includes an E&P tool (230), a data repository (238) for storing input data, intermediate data, and resultant outputs of the E&P tool (230), and a field task engine (231) for performing various tasks of the field operation. In one or more embodiments, the data repository (238) may include one or more disk drive storage devices, one or more semiconductor storage devices, other suitable computer data storage devices, or combinations thereof. In one or more embodiments, content stored in the data repository (238) may be stored as a data file, a linked list, a data sequence, a database, a graphical representation, any other suitable data structure, or combinations thereof.

In one or more embodiments, the content stored in the data repository (238) includes well data (e.g., well data A (233), well data B (234), etc.), fracturing parameters (235), well data analysis result (236), and modeling result (237). In one or more embodiments, the well data includes distributed flow data, distributed acoustic data, and distributed temperature data. For example, the distributed flow data A (233-1), distributed acoustic data A (233-2), and distributed temperature data A (233-3) represent a location-dependent flow rate, a location-dependent acoustic parameter, and a location-dependent temperature, respectively, inside and along the wellbore formed by the treatment well tubing (221-1) depicted in FIG. 1.2 above. In one or more embodiments, the well data A (233) includes distributed optical fiber data of the treatment well (221) depicted in FIG. 1.2 above. In one or more embodiments, the well data A (233) includes accelerometer logging data obtained from the treatment well (221) in addition to the distributed optical fiber data depicted in FIG. 1.2 above. Similarly, the distributed flow data B (234-1), distributed acoustic data B (234-2), and distributed temperature data B (234-3) represent the location-dependent flow rate, the location-dependent acoustic parameter, and the location-dependent temperature, respectively, inside and along the wellbore formed by the monitoring well tubing (223-1) depicted in FIG. 1.2 above. In one or more embodiments, the well data B (234) includes distributed optical fiber data of the monitoring well (223) depicted in FIG. 1.2 above. In one or more embodiments, the well data B (234) includes accelerometer logging data obtained from the monitoring well (223) in addition to the distributed optical fiber data depicted in FIG. 1.2 above. An example of the well data A (233) or well data B (234) is described in reference to FIG. 3.1 below.

In one or more embodiments, the monitoring well (223) is a producing well, and the production flow rate (or other production flow characteristic) is represented, at least in part, by the distributed flow data B (234-1). In one or more embodiments, the producing well is separate from the treatment well (221) and the monitoring well (223). Accordingly, the production flow rate (or other production flow characteristic) is represented by other well data separate from the well data A (233), well data B (234).

In one or more embodiments, the fracturing parameters (235) are parameters used to select the fracturing fluid and to configure the fracturing equipment (221-6) depicted in FIG. 1.2 above for performing the fracturing operation. In one or more embodiments, the fracturing parameters (235) include fracturing fluid parameters (235-1), staging parameters (235-2), perforation parameters (235-3), etc. of the fracturing operation. For example, the fracturing fluid parameters (235-1) may include the type, rate, pressure, temperature, volume, viscosity, or other property of the fracturing fluid and/or the proppant. The staging parameters (235-2) may include the number of fracturing operation stages, the duration of each stage, the time period separating consecutive stages, or other fracturing operation schedule parameters such as a ramping profile of the fracturing fluid parameters (235-1), etc. The perforation parameters (235-3) may include the number of perforations, as well as the dimension, shape, location, and other property of each perforation, etc. of each of one or more of the perforations (221-3) depicted in FIG. 1.2 above. In addition, the fracturing parameters (235) may also include various parameters used to configure mechanisms of the fracturing equipment (221-6) for performing the fracturing operation. An example of the fracturing parameters (235) is described in reference to FIG. 3.1 below.

In one or more embodiments, the well data analysis result (236) includes one or more active perforation locations (e.g., active perforation location (236-1)), one or more micro-seismic event locations (e.g., micro-seismic event location (236-2)), and other results derived from the well data. In particular, the active perforation location (236-1) represents a location of an open perforation, in the perforations (221-3) depicted in FIG. 1.2 above, where fracturing fluid flows through during the fracturing operation. In contrast, the perforations (221-3) may include a plugged perforation that is un-intentionally plugged causing obstruction to the fracturing fluid flow during the fracturing operation. An example of the well data analysis result (236) is described in reference to FIG. 3.2 below.

In one or more embodiments, the modeling result (237) is a result of performing the fracturing modeling described below. For example, the modeling result (237) may include one or more predicted production flow characteristics, predicted injection flow characteristics, and/or predicted fracture characteristics based on a given set of values of the fracturing parameters (235). In other words, if the fracturing operation of the treatment well (221) is to be performed based on the given set of values of the fracturing parameters (235), the fracturing operation is likely to produce the predicted production flow characteristics and/or predicted fracture characteristics. Similarly, if the fracturing operation of the treatment well (221) is to be performed based on the given set of values of the fracturing parameters (235), the fracturing operation is likely performed with the predicted injection flow characteristics. The predicted production flow characteristics are predicted characteristics of the production flow. For example, the predicted production flow characteristics may include a prediction of a production flow rate or other property of the production flow. In contrast, actual production flow characteristics may include a measurement of a production flow rate or other property of the production flow. The predicted fracture characteristics are predicted characteristics of the fracture. For example, the predicted fracture characteristics may include a prediction of a location, volume, permeability, propagation, or other property of one or more fractures. In contrast, actual fracture characteristics may include a measurement of a location, volume, permeability, propagation, or other property of one or more fractures. The predicted injection flow characteristics are predicted characteristics of the injection flow. For example, the predicted injection flow characteristics may include a prediction of an injection flow rate or other property of the injection flow. In contrast, actual injection flow characteristics may include a measurement of an injection flow rate or other property of the injection flow.

In another example, the modeling result (237) may include one or more estimated parameter values of the fracturing parameters (235) based on a target/desired production flow characteristic and/or a target/desired fracture characteristic. In other words, to achieve the target/desired production flow characteristic and/or target/desired fracture characteristic, the one or more estimated parameter values of the fracturing parameters (235) may be used in performing the fracturing operation. An example of the modeling result (237) is described in reference to FIG. 3.2 below.

In one or more embodiments, the E&P tool (230) includes the input receiver (241), the well data analyzer (242), the fracturing model generator (243), and the modeling engine (245). Each of these components of the E&P tool (230) is described below.

In one or more embodiments, the input receiver (241) is configured to obtain the well data (e.g., well data A (233), well data B (234), etc.) for analysis by the well data analyzer (242) and the modeling engine (245). In one or more embodiments, the input receiver (241) obtains the well data (e.g., well data A (233), well data B (234), etc.), at least in part, from the fiber sensor device (222) depicted in FIG. 1.2 above. In one or more embodiments, the input receiver (241) obtains the well data (e.g., well data A (233), well data B (234), etc.), at least in part, from the surface unit (112) depicted in FIG. 1.1 above. For example, the input receiver (241) may obtain one or more portions of the well data (e.g., well data A (233), well data B (234), etc.) from the surface unit (112) intermittently, periodically, in response to a user activation, or as triggered by an event. Accordingly, the intermediate and final results of the well data analyzer (242)

and the modeling engine (245) may be generated intermittently, periodically, in response to a user activation, or as triggered by an event. In one or more embodiments, the input receiver (241) obtains the well data (e.g., well data A (233), well data B (234), etc.) using the method described in reference to FIGS. 2.1 and 2.2 below.

In one or more embodiments, the well data analyzer (242) is configured to generate the well data analysis result (236) based on the well data (e.g., well data A (233), well data B (234), etc.). In one or more embodiments, the well data analyzer (242) generates the well data analysis result (236) using the method described in reference to FIGS. 2.1 and 2.2 below.

In one or more embodiments, the fracturing model generator (243) is configured to generate and/or adjust the fracturing model (244) based, at least in part, on the fracturing parameters (235) and the well data analysis result (236). In one or more embodiments, the fracturing model (244) describes the relationship between the production flow characteristics, the fracture characteristics, and the fracturing parameters (235). In one or more embodiments, the fracturing model (244) includes the production flow characteristics and/or fracture characteristics, the fracturing parameters (235), and a description of the relationship there-between. For example, the relationship may be described using one or more of a mathematical formula, a logical expression, a tabulated format, etc. In one or more embodiments, the fracturing model generator (243) generates the fracturing model (244) using the method described in reference to FIGS. 2.1 and 2.2 below.

Because of the inability and/or infeasibility of sensors to gather data representing each location of the subterranean formation, full knowledge of the subterranean formation is generally not available. Accordingly, the fracturing model (244) is an approximation of the subterranean formation based at least in part on the sensor data. The greater the accuracy of the fracturing model (244), the more efficient and productive are field operations to gather hydrocarbons and other valuable assets from the subterranean formation. One or more embodiments improve the accuracy of the fracturing model (244), and thereby improve the field operations performed.

In one or more embodiments, the modeling engine (245) is configured to perform fracturing modeling of a field based, at least in part, on the fracturing parameters (235) and the well data analysis result (236). In one or more embodiments, fracturing modeling includes predicting the production flow characteristics and/or fracture characteristics based on a given set of values of the fracturing parameters (235). In one or more embodiments, the fracturing modeling includes estimating one or more parameter values of the fracturing parameters (235) based on a target/desired production flow characteristic and/or target/desired fracture characteristic. In one or more embodiments, the fracturing modeling includes adjusting one or more parameter values of the fracturing parameters (235) based on an observed production flow characteristic and/or observed fracture characteristic. In one or more embodiments, the modeling engine (245) performs the fracturing modeling using the method described in reference to FIGS. 2.1 and 2.2 below.

In one or more embodiments, the input data, intermediate data, and resultant outputs of the E&P tool (230) may be displayed to a user using a two dimensional (2D) display, three dimensional (3D) display, or other suitable displays. In one or more embodiments, the E&P computer system (118) includes the field task engine (231) that is configured to generate a field operation control signal based at least on a result generated by the E&P tool (230), such as based on the modeling result (237). As noted above, the field operation equipment depicted in FIG. 1.1 above may be controlled by the field operation control signal. For example, the field operation control signal may be used to control fracturing equipment, an actuator, a fluid valve, or other electrical and/or mechanical devices disposed about the field (100) depicted in FIG. 1.1 above. In particular, the field operation control signal may be used to control the fracturing equipment (221-6) depicted in FIG. 1.2 above.

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIGS. 2.1 and 2.2 depict an example method in accordance with one or more embodiments. For example, the method depicted in FIGS. 2.1 and 2.2 may be practiced using the E&P computer system (118) described in reference to FIGS. 1.1 and 1.3 above. In one or more embodiments, one or more of the elements shown in FIGS. 2.1 and 2.2 may be omitted, repeated, and/or performed in a different order. Accordingly, embodiments of improved stimulation using real-time fiber-derived information and fracturing modeling should not be considered limited to the specific arrangements of elements shown in FIGS. 2.1 and 2.2.

In particular, FIG. 2.1 shows an example flow chart to model a fracturing operation. Initially, in Block 201, distributed optical fiber data is obtained from a downhole sensor of a treatment well in the subterranean formation. In one or more embodiments, the distributed optical fiber data is obtained during a fracturing operation. In one or more embodiments, the distributed optical fiber data is obtained from an optical fiber (i.e., the downhole sensor) that monitors a fluid flow through the treatment well. For example, the distributed optical fiber data corresponds to information regarding the flow of fracturing fluid along the wellbore of the treatment well during the fracturing operation.

In Block 202, based on the distributed optical fiber data, an active perforation location is determined from a set of pre-determined perforation locations of the treatment well. In one or more embodiments, the set of pre-determined perforation locations is used as a basis to define a fracturing operation plan for achieving a target production flow characteristic. For example, the fracturing operation plan may specify an injection schedule based on the number of perforations and where the perforations are located in the treatment well perforations. Accordingly, one or more producing wells are expected to reach the target production flow rate subsequent to performing the fracturing operation according to the fracturing operation plan.

In one or more embodiments, determining the active perforation location includes analyzing the distributed optical fiber data to detect a change of the fluid flow along the wellbore of the treatment well. As noted above, the distributed optical fiber data includes a flow noise component that corresponds to an amount of fluid flow along the wellbore. A location along the wellbore where a magnitude change in the distributed optical fiber data exceeds a pre-determined threshold level is identified as a location of the fluid flow through an open perforation in the treatment well tubing into the surrounding rocks. In other words, the location along the wellbore where such magnitude change in the distributed optical fiber data occurs and persists throughout the fluid injection is determined to be an active perforation location.

In Block 203, the active perforation location is compared to the set of pre-determined perforation locations to identify an inactive perforation of the treatment well. In one or more embodiments, one or more active perforation locations are detected in Block 202 above. Accordingly, the non-active perforation is identified by removing the detected active perforation locations from the set of pre-determined perforation locations. Any remaining perforation location in the set is identified as a non-active perforation. If no perforation location remains, then the pre-determined perforation locations in the set are active and no non-active perforation location is identified.

In Block 204, monitoring well data is obtained from a downhole sensor of a monitoring well in the subterranean formation. In one or more embodiments, the monitoring well data is obtained during the fracturing operation. In one or more embodiments, the monitoring well data is obtained from an optical fiber (i.e., the downhole sensor) that monitors micro-seismic events created by the fracturing operation. In other words, the monitoring well data includes distributed optical fiber data associated with the micro-seismic events. In one or more embodiments, at least a portion of the monitoring well data is obtained from an accelerometer or geophone (i.e., the downhole sensor) that monitors micro-seismic events created by the fracturing operation. In other words, the monitoring well data includes an accelerometer logging data associated with the micro-seismic events.

In Block 205, a micro-seismic event location of the fracturing operation is determined. In particular, the micro-seismic event location is a location of the fracturing that occurs in the subterranean formation. In one or more embodiments, the micro-seismic event location is determined by analyzing the distributed optical fiber data of the treatment well. The micro-seismic event location is determined by analyzing the monitoring well data of the monitoring well. In one or more embodiments, the micro-seismic event location is determined by analyzing the distributed optical fiber data of the treatment well and the monitoring well data of the monitoring well.

As depicted in FIG. 1.2 above, the distributed optical fiber data of the treatment well and/or the monitoring well includes a fracturing noise component. Further, the accelerometer/geophone logging data of the monitoring well may also represents a location-dependent level of the fracturing noise. In one or more embodiments, the micro-seismic event location is determined by analyzing the distributed optical fiber data of the treatment well and/or the monitoring well data of the monitoring well using a triangulation, trilateration, and/or triangulateration techniques.

In Block 206, a fracturing model for the subterranean formation is generated based at least on the active perforation location and/or the micro-seismic location. Initially, production flow characteristics (e.g., production flow rate, etc.) are obtained from one or more producing wells. Further, the fracture characteristics (e.g., location, volume, permeability, propagation, etc. of one or more fractures) are estimated based on one or more micro-seismic locations. The fracturing parameters (e.g., fracturing parameters, staging parameters, perforation parameters, etc.) are specified in a fracturing operation plan based on one or more active perforation locations. In addition, the relationship between the fracture characteristics and the fracturing parameters is derived based on a rock mechanics analysis. Similarly, the relationship between the production flow characteristics and the fracture characteristics is derived based on a fluid flow analysis. Accordingly, the fracturing model is generated by combining the production flow characteristics, the fracture characteristics, the fracturing parameters, and the derived relationships. In one or more embodiments, the fracturing model is generated by adjusting a previous or pre-existing fracturing model based on the active perforation location and/or the micro-seismic location determined above. FIG. 2.2 describes a method to generate the fracturing model by adjusting a previous or pre-existing fracturing model.

In Block 207, modeling of the fracturing operation is performed based on the fracturing model to generate a modeling result. In one or more embodiments, modeling of the fracturing operation includes predicting the production flow rate and/or fracture characteristics based on a given set of values of the fracturing parameters, such as a set of perforation locations. In one or more embodiments, modeling of the fracturing operation includes estimating parameter values of the fracturing parameters to achieve a target production flow characteristic and/or a target fracture characteristic. In one or more embodiments, modeling of the fracturing operation includes determining one or more fracturing parameters to re-activate one or more non-active perforations.

FIG. 2.2 shows an example flow chart to perform a fracturing operation. Initially, in Block 211, a modeling result of a fracturing operation stage is generated based on a fracturing model. In one or more embodiments, the fracturing operation stage is one of a sequence of stages of a fracturing operation. In one or more embodiments, the modeling result is generated prior to performing the fracturing operation stage and generated as a prediction of the result of the fracturing operation stage. In particular, the modeling result includes one or more of a fracturing parameter set, a predicted fracture characteristic, and a predicted production and/or injection flow characteristic. In one or more embodiments, the fracturing parameter set includes at least a portion of the fracturing parameters described in reference to FIG. 1.3 above. In one or more embodiments, the predicted fracture characteristic includes a predicted location, volume, permeability, propagation, etc. of one or more fractures as a result of performing the fracturing operation stage based on the fracturing parameter set. In one or more embodiments, the predicted production flow characteristic includes a predicted producing well flow rate as a result of performing the fracturing operation stage based on the fracturing parameter set. In one or more embodiments, the predicted injection flow characteristic includes a predicted fracturing fluid flow rate during performing the fracturing operation stage based on the fracturing parameter set.

In Block 212, the fracturing operation stage is performed based on the fracturing parameter set for achieving the predicted fracture characteristic and/or the predicted flow characteristic. As noted above, the fracturing parameter set includes fracturing fluid parameters, staging parameters, perforation parameters, etc. In one or more embodiments, one or more treatment wells are configured based on the perforation parameters. Accordingly, fracturing fluids are selected based on the fracturing fluid parameters and injected according to the staging parameters.

In one or more embodiments, a decision to perform the fracturing operation stage is based on an economic parameter computed from a cost of the fracturing operation and a predicted producing well flow rate. For example, the economic parameter may include one or more of Net Present Value (NPV), Discounted Cash Flow Rate of Return (DC-FROR), and Payback period. In one or more embodiments, the fracturing operation stage is performed in response to the economic parameter meeting a pre-determined criterion.

In Block 213, during the fracturing operation stage, distributed optical fiber data is obtained from a downhole sensor of a treatment well. In one or more embodiments, the distributed optical fiber data is obtained from an optical fiber cable (i.e., the downhole sensor) of the treatment well.

In Block 214, the fracturing model is adjusted based on a difference between the distributed optical fiber data and the modeling result. In one or more embodiments, the distributed optical fiber data may indicate one or more non-active perforations resulting in an actual production flow rate that is lower than the predicted flow characteristic. In other words, the difference between the distributed optical fiber data and the modeling result includes the non-active perforations and the lower-than-predicted flow characteristic. In one or more embodiments, the distributed optical fiber data may indicate one or more micro-seismic event locations that are inconsistent with the predicted fracture characteristic. In other words, the difference between the distributed optical fiber data and the modeling result includes the discrepancy between the micro-seismic event locations and the predicted fracture characteristic.

In one or more embodiments, the fracturing model is adjusted by updating the perforation parameters based on the detected non-active perforations. For example, the non-active perforations may be removed from consideration in the perforation parameters. In one or more embodiments, the fracturing model is adjusted by adjusting the fracturing fluid parameters and/or the staging parameters to re-activate the non-active perforations. For example, the fracturing fluid pressure and/or injection time may be increased to open plugged perforations of the non-active perforations. In one or more embodiments, the fracturing model is adjusted by adjusting the predicted fracture characteristic and/or the predicted production/injection flow characteristic. For example, the predicted fracture characteristic and/or the predicted production/injection flow characteristic may be adjusted based on reduced injection efficiency due to the non-active perforations. In another example, the predicted fracture characteristic and/or the predicted production/injection flow characteristic may be adjusted based on the discrepancy between the micro-seismic event locations and the predicted fracture characteristic.

In one or more embodiments, the fracturing model is adjusted, in response to obtaining the distributed optical fiber data, within a pre-determined time period (e.g., 5 minutes, an hour, etc.) from performing the fracturing operation stage. In this context, the adjusted fracturing model is referred to as a real-time adjusted fracturing model.

In Block 215, during the fracturing operation stage, monitoring well data is obtained from a downhole sensor of a monitoring well. In one or more embodiments, the monitoring well data is obtained from an optical fiber cable (i.e., the downhole sensor) of the monitoring well. In one or more embodiments, the monitoring well data is obtained from an accelerometer sensor (i.e., the downhole sensor) of the monitoring well.

In Block 216, the fracturing model is adjusted based on a difference between the monitoring well data and the modeling result. In one or more embodiments, the monitoring well data may indicate one or more micro-seismic event locations that are inconsistent with the predicted fracture characteristic. In other words, the difference between the monitoring well data and the modeling result includes the discrepancy between the micro-seismic event locations and the predicted fracture characteristic.

In one or more embodiments, the fracturing model is adjusted by adjusting the predicted fracture characteristic and/or the predicted production/injection flow characteristic based on the discrepancy between the micro-seismic event locations and the predicted fracture characteristic. For example, the predicted fracture characteristic and/or the predicted production/injection flow characteristic may be adjusted based on a combination of the discrepancy identified from the distributed optical fiber data of the treatment well and the discrepancy identified from the monitoring well data.

In one or more embodiments, the fracturing model is adjusted, in response to obtaining the monitoring well data, within a pre-determined time period (e.g., 5 minutes, an hour, etc.) from performing the fracturing operation stage. In this context, the adjusted fracturing model is referred to as a real-time adjusted fracturing model.

In Block 217, a determination is made as to whether any more fracturing operation stages are to be performed. If the determination is positive, i.e., there is at least one more fracturing operation to be performed, the method returns to Block 211. If the determination is negative, i.e., there is no more fracturing operation to be performed, the method ends.

In one or more embodiments, each iteration of Block 211, Block 212, Block 213, Block 214, Block 215, Block 216, and Block 217 corresponds to one fracturing operation stage. In other words, a fracturing operation with a sequence of stages is performed using multiple iterations of the method described above. In particular, each stage corresponds to one of the iterations. Accordingly, as the fracturing operation is performed from one stage (referred to as the first stage) to the next stage (referred to as the second stage), the fracturing model adjusted in an earlier iteration (corresponding to the first stage) is used to generate the modeling result to be used in the next iteration (corresponding to the second stage). In one or more embodiments, the second stage is performed based on the modeling result generated within a pre-determined time period (e.g., 5 minutes, an hour, etc.) from injecting the fracturing fluid during the first stage. In one or more embodiments, the pre-determined time period (e.g., 5 minutes, an hour, etc.) is within the delay time period separating the first stage and the second stage.

In one or more embodiments, a control signal is generated based on the modeling result subsequent to the first stage and within the delay time period separating the first stage and the second stage. Specifically, the second stage is performed based on the control signal. For example, the control signal may be used to control a mechanism of the fracturing equipment. In this context, the fracturing modeling is referred to as being performed in real-time with respect to the fracturing operation.

An example of using the methods depicted in FIGS. 2.1 and 2.2 above is described in reference to FIG. 3.3 below.

FIGS. 3.1, 3.2, and 3.3 show an example in accordance with one or more embodiments. In one or more embodiments, the example shown in these figures may be practiced using the E&P computer system shown in FIGS. 1.1 and 1.3 and the method described in reference to FIGS. 2.1 and 2.2 above. The following example is for illustrative purposes only and is not intended to limit the scope of the claims.

FIG. 3.1 shows a screenshot of an example distributed optical fiber data (310) obtained during a fracturing operation that is performed in several stages, such as the stage A (312-1), stage B (312-2), stage C (312-3), stage D (312-4), etc. In this example, the fracturing operation is performed based on the fracturing parameters (313) that include the proppant concentration (313-1), wellhead pressure (313-2), pump rate (313-3), perforation locations A (311), perforation locations B (312), etc. Within the distributed optical fiber data (310), a horizontal arrow indicates a distance axis representing a distance along the wellbore of a treatment well. In addition, a vertical arrow indicates a time axis. As shown in FIG. 3.1, the data values (or optical fiber signal magnitudes) are represented by a gray scale rendering within the distributed optical fiber data (310). In particular, the data values (or optical fiber signal magnitudes) vary (i.e., location-dependent) along the wellbore or horizontal axis. In addition, the data values (or optical fiber signal magnitudes) vary along the vertical axis as the fracturing operation progresses through the stages. Within the fracturing parameters (313), the proppant concentration (313-1), wellhead pressure (313-2), and pump rate (313-3) are associated with a vertical arrow indicating the same time axis as the distributed optical fiber data (310) and a horizontal axis indicating the parameter values. As an example, the perforation locations A (311) may be used to inject the fracturing fluid during the stage A (312-1) and stage B (312-2) while the perforation locations B (312) may be used during the stage C (312-3) and stage D (312-4). In particular, the perforation locations A (311) and the perforation locations B (312) are isolated from each other using a plug (not shown) to operate independent from each other. By analyzing the distributed optical fiber data (310), an active perforation location (311-1) and a non-active perforation location (311-2) are determined from the perforation locations A (311).

FIG. 3.2 shows a screenshot of an example modeling result and well data analysis result of the stage A (312-1) depicted in FIG. 3.1 above. As shown in FIG. 3.2, the modeling result and well data analysis result are displayed as a two dimensional cross sectional view showing the trajectories of a treatment well (321), a producing well (322), and a monitoring well (323). The modeling result includes a pre-determined set of perforation locations (324), a number of predicted fractures (denoted by elongated wedge-shaped icons, such as the predicted fracture (326)), and a predicted production flow rate (not shown) of the producing well (322). For example, the perforation locations (324) may correspond to the perforation locations A (311) and perforation locations B (312) depicted in FIG. 3.1 above. The well data analysis result includes a number of micro-seismic event locations (denoted as circular icons, such as the micro-seismic event location (325)), an active perforation location (324-1), and a non-active perforation location (324-2). For example, the active perforation location (324-1) and the non-active perforation location (324-2) may correspond to the active perforation location (311-1) and the non-active perforation location (311-2), respectively, depicted in FIG. 3.1 above. Based on a comparison between the predicted fractures (e.g., predicted fracture (326)) and the detected micro-seismic event locations ((e.g., micro-seismic event location (325)), a difference A (325-1) and difference B (325-2) are identified. For example, the differences are locations of the micro-seismic event locations that do not have predicted fractures. Accordingly, the fracturing model used in the fracturing modeling for the stage A (312-1) is adjusted based on the difference A (325-1) and difference B (325-2) before using to perform the fracturing modeling for the stage B (312-2).

The example described in reference to FIGS. 3.1 and 3.2 above may be applied to improve the current state-of-the-art of hydraulic fracture treatment design. In particular, the improvement is based on modeling prior to fracture treatment including (1) gathering of pertinent rock properties (petrophysical, geomechanical); (2) building an appropriate mechanical earth model including layered well data including height, permeability, pressure, etc.; (3) simulation with a calibrated model of hydraulic fracturing including fracture surface area, conductivity, geometry; and (4) simulation of production from said fracture once a drawdown (production) is applied to the well. Given an expected financial cost of the treatment and expected recovery (production) of hydrocarbon, economic parameters such as Net Present Value (NPV), Discounted Cash Flow Rate of Return (DCFROR), and/or Payback period are determined. The well owner may then make the go/no-go decision for the fracture treatment based upon the economic parameters as compared to hurdle rates. For example, a 30% ROR may justify the fracture treatment.

However, in many cases, the performed fracture treatment may not behave as modeled and production may be highly variable relative to predictions. This introduces a large measure of uncertainty into oil company methodologies. For this reason, traditionally, unconventional shale reservoir development has been treated as a statistical play where a basket of many wells will eventually statistically generate a desired ROR given an accurate or suitable commodity price strip (e.g., $50 oil price). Due to the uncertainty, many well owners may use a trial-and-error approach, which generates a statistical result with a margin of error. For example, a high oil price (e.g., $100/bbl) may allow more room for error, but modeling accuracy improvement is performed to generate adequate results in low price regimes (e.g., $40 bbl).

An example well optimization workflow (330) to address this uncertainty is described in FIG. 3.3 below, which improves decision making and generates increased average ROR for unconventional/shale related stimulation treatments. In particular, the example work flow leverages cloud-based processing capability with integrated advanced modeling tools including an unconventional fracturing model, an auto-gridded numerical reservoir simulator, and an economic calculation engineer so as to continuously calculate and update economic parameters during a hydraulic fracturing operation in real-time. In addition to calculating parameters such as NPV, DCFROR, and payback period, the example workflow may be used to determine a continuously updated value for $/BOE versus the cost to produce a barrel of oil equivalent.

Besides an integrated, cloud-based software architecture, the example well optimization workflow (330) is enabled with distributed fiber in the wellbore measurements of DTS and hDVS (distributed temperature, strain, etc.) described above. By continuously updating a hydraulic fracturing model with quantitative rates and volumes of stimulation fluid and proppant by cluster, the calibrated hydraulic fracturing model may be continuously re-run and updated geometry generated. The updating may include updating end-of-fracture-treatment extrapolation of geometry (final geometry). The final geometry estimation is then auto-gridded into a calibrated numerical reservoir simulator, and an updated production forecast is generated and economic parameters are determined including $/BOE. For example, if 2 out of 4 perforation clusters are taking material, then a resultant $/BOE is indicated. The issuer may decide to pump a diverter pill to plug existing clusters and cause opening of the additional 2 clusters not taking fluid to allow adequate stimulation. An updated $/BOE calculation may show the beneficial impact on $/BOE due to the fracture treatment on a real-time basis. In other words, decisions are taken during the fracture treatment based on constantly updating economic parameters so as to achieve 100% of the potential economic value of the well.

As shown in FIG. 3.3, the well optimization workflow (330) is performed through iterations of workflow Blocks 311 through 336. As an example, the iterations of workflow Blocks 311 through 336 may be described for the stage A (312-1), stage B (312-2), stage C (312-3), etc. depicted in FIG. 3.1 above. During the stage A (312-1) in Block 331, the optical fiber cable is lowered into the treatment well where the perforations A (311) are configured. Accordingly, the stimulation is initiated to perform the fracturing operation by injecting the fracturing fluid using the perforations A (311). During the stage A (312-1), fracturing fluid flow characteristics are derived from the distributed optical fiber data and used to determine active perforation locations and any non-active perforation location within the perforations A (311). In addition, micro-seismic events are monitored to determine hypocenters of rock failures.

In Block 332, fracture evolution is modeled in real-time during the stage A (312-1) based on the hypocenters determined in Block 331 above.

In Block 333 and 334, the fracturing model is updated in real-time using the fiber-derived flow information, i.e., the active and non-active perforation locations and the modeled result of fracturing evolution. In one or more embodiments, a single-well model simulation (referred to as the single well template) is updated in Block 333 while the discrete fracture network (DFN) and three-dimensional mechanical earth model (3D MEM) are updated in Block 334. In particular, the single well template shows DTS and hDVS data displayed in real time. For example, hDVS (heterodyne Distributed Vibration Sensor) data is displayed along the wellbore on upper part of the wellbore and DTS (Distributed Temperature Sensing) data is displayed on the lower part of the wellbore. On such plot, the cooling effect and the vibration spikes are discernible at the perforations, where fluid enters the formation, to infer the differences in flow rate through the perforations. Further, the DFN characterizes the spatial variability of natural fracture intensity and orientation to represent the pre-existing natural fracture network surrounding the well. The 3D MEM is a repository of data representing the mechanical properties of rocks and fractures as well as the stresses, pressures and temperatures at depth. For example, a user (e.g., engineer, geoscientist, etc.) may use the 3D MEM to understand how rocks deform, and sometimes fail, in response to drilling, completion and production operations. In one or more embodiments, the 3D MEM is used to create fracture models for the engineers and geoscientists to understand the interaction of hydraulic fracture and natural fracture networks.

In Block 335, fracturing modeling is performed using the updated fracturing model to optimize the completion. If the time for the fracturing modeling allows the optimization to be applied to the stage B (312-2), stimulation design is performed in Block 336 for the stage B (312-2). Accordingly, the next iteration of the well optimization workflow (330) will be performed for the stage B (312-2). However, if the time required for the fracturing modeling does not allow the optimization to be applied to the stage B (312-2) but is in time for the stage C (312-3), stimulation design will be performed in Block 336 for the stage C (312-3). Accordingly, the next iteration of the well optimization workflow (330) will be performed for the stage C (312-3).

In Block 336, the fracturing parameters (313) are determined for the stage B (312-2) or stage C (312-3) by the stimulation design based on the fracturing modeling result determined in Block 336. If the fracturing parameters (313) are determined in Block 336 for the stage B (312-2), the proppant concentration (313-1) and pump rate (313-3) are determined based on the perforations A (311) for the duration of the stage B (312-2). If the fracturing parameters (313) are determined in Block 336 for the stage C (312-3), the proppant concentration (313-1) and pump rate (313-3) are determined based on the perforations B (312) for the duration of the stage C (312-3).

Subsequent to completing one iteration as described above, depending on how long the time is for the fracturing modeling in the completed iteration, the next iteration of the well optimization workflow (330) is performed for either the stage B (312-2) or the stage C (312-3). As indicated by the circular arrow in FIG. 3.3, the well optimization workflow (330) is iteratively performed as the fracturing operation stages are performed until completion of the fracturing operation.

The example well optimization workflow (330) described above may be performed in the following scenario.

(1) A well is instrumented with distributed fiber, either conveyed via cable or coiled tubing or cemented in place. This fiber will allow for distributed temperature and vibration measurements so as to determine perforation cluster response to fracturing stimulation.

(2) An adequate petrophysical and geomechanical model is determined for the relevant reservoir rock and its surrounding layers. Determining the models may be performed via interval coring, wireline logs, seismic gathering, pressure transient tests, and other means, with a resulting detailed geocellular model to serve as a basis for further design.

(3) Additional geocellular model determination is conducted via machine-learning techniques, which utilize public-domain data of geomechanical and petrophysical properties, and stimulation response to generate proxy-reservoir models.

(4) Design activities are then undertaken utilizing an unconventional fracturing model (UFM), which simulates fracture geometry based upon various user-supplied pumping schedules. This fracture geometry contains parameters such as created fracture surface area, fracture conductivity by segment, and the x-y-z (3D) location of the fracture throughout its extent.

(5) From a range of realizations of hydraulic fracturing geometry in (4), numerical reservoir simulation of productivity is made so as to generate flow-performance results for these realizations.

(6) Economic calculations are then performed to determine an optimum pump schedule so as to generate a desired NPV/ROR as per the operating company objective. In general, this NPV represent a Maximum Achievable Performance (MAP) for the well.

(7) Following design, the phase moves to fracture treatment execution. The goal is to achieve the MAP for the well. An initial injection profile is obtained per stage via the fiber-optic measurements.

(8) While pumping each individual stage, data is gathered in real-time and uploaded into the cloud-based software engine, which continuously updates the design process (fracture geometry-well performance-economics) so as to provide the fracture engineer with relevant data towards making decisions in real-time during the pumping.

(9) A percentage of MAP achieved is calculated and displayed during pumping operations. Decisions taken to pump a diversion pill, change the pumping schedule including proppant volumes and/or fluid volumes, and pump rate, are simulated in advance of the decision on a real-time basis and provide an updated projected % MAP.

(10) The fracture engineer may choose to make the proper decisions in real-time during pumping so as to achieve the 100% of MAP.

(11) At the end of the fracture treatment, 100% MAP may be achieved and verified via the fiber measurements in the well throughout the pumping.

(12) Production performance is monitored and compared to forecast values so as to validate the fracture treatment design.

Embodiments of improved stimulation using real-time fiber-derived information and fracturing modeling may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a number of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object.

The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above descriptions of functions present a few examples of functions performed by the computing system of FIG. 4.1 and the nodes and/or client device in FIG. 4.2. Other functions may be performed using one or more embodiments.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware, or combinations thereof.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method for performing a fracturing operation in a subterranean formation of a field, comprising:
   determining a maximum achievable performance metric for the fracturing operation using a fracturing model;
   obtaining, during the fracturing operation, distributed optical fiber data from downhole optical fiber sensors of a treatment well in the subterranean formation, wherein the distributed optical fiber data comprise vibration measurement data and temperature measurement data;
   determining, during the fracturing operation and based on the distributed optical fiber data indicating vibration spikes and a cooling effect, an active perforation location and an inactive perforation location from a plurality of pre-determined perforation locations of the treatment well;
   generating, during the fracturing operation and based at least on the active perforation local, a revised fracturing model for the subterranean formation;
   performing, during the fracturing operation and based on the revised fracturing model, modeling of the fracturing operation to generate a performance metric;
   deciding, during the fracturing operation, to formulate a diversion pill operation for activation of the inactive perforation location based on a comparison of the performance metric to the maximum achievable performance metric;
   generating, during the fracturing operation and based at least on the active perforation location, the inactive perforation location and the diversion pill operation, a projected fracturing model for the subterranean formation;
   performing, during the fracturing operation, based on the projected fracturing model, modeling of the fracturing operation to generate a projected performance metric; and
   deciding, during the fracturing operation, to perform the diversion pill operation based on a comparison of the projected performance metric and one or more of the performance metric and the maximum achievable performance metric.

2. The method of claim 1, further comprising:
   determining, based at least on the distributed optical fiber data, a micro-seismic event location of the fracturing operation.

3. The method of claim 2, further comprising:
obtaining, during the fracturing operation, monitoring well data from at least one downhole sensor of a monitoring well in the subterranean formation, wherein determining the micro-seismic event location is further based on the monitoring well data.

4. The method of claim 3, wherein the monitoring well data comprise distributed acoustic data and distributed temperature data.

5. The method of claim 1, further comprising:
injecting, during a first stage of the fracturing operation, fluid into the subterranean formation, wherein generating the projected performance metric is within a pre-determined time period from injecting the fluid during the first stage;
generating, subsequent to the first stage, a control signal based on the projected performance metric; and
performing a second stage, subsequent to the first stage, of the fracturing operation based on the control signal.

6. The method of claim 1, wherein the fracturing model comprises a single-well template, a discrete fracture network and a three-dimensional mechanical earth model.

7. A system comprising:
a computer processor;
memory storing instructions executed by the computer processor, wherein the instructions comprise functionality to:
determine a maximum achievable performance metric for a fracturing operation using a fracturing model;
obtain, during the fracturing operation, distributed optical fiber data from downhole optical fiber sensors of a treatment well in the subterranean formation, wherein the distributed optical fiber data comprise vibration measurement data and temperature measurement data;
determine, during the fracturing operation and based on the distributed optical fiber data indicating vibration spikes and a cooling effect, an active perforation location and an inactive perforation location from a plurality of pre-determined perforation locations of the treatment well;
generate, during the fracturing operation and based at least on the active perforation local, a revised fracturing model for the subterranean formation;
perform, during the fracturing operation and based on the revised fracturing model, modeling of the fracturing operation to generate a performance metric;
decide, during the fracturing operation, to formulate a diversion pill operation for activation of the inactive perforation location based on a comparison of the performance metric to the maximum achievable performance metric;
generate, during the fracturing operation and based at least on the active perforation location, the inactive perforation location and the diversion pill operation, a projected fracturing model for the subterranean formation;
perform, during the fracturing operation, based on the projected fracturing model, modeling of the fracturing operation to generate a projected performance metric; and
decide, during the fracturing operation, to perform the diversion pill operation based on a comparison of the projected performance metric and one or more of the performance metric and the maximum achievable performance metric.

8. The system of claim 7, wherein the fracturing model comprises a single-well template, a discrete fracture network and a three-dimensional mechanical earth model.

9. One or more non-transitory computer-readable storage media that comprise program code executable by a computing system to:
determine a maximum achievable performance metric for a fracturing operation using a fracturing model;
obtain, during the fracturing operation, distributed optical fiber data from downhole optical fiber sensors of a treatment well in the subterranean formation, wherein the distributed optical fiber data comprise vibration measurement data and temperature measurement data;
determine, during the fracturing operation and based on the distributed optical fiber data indicating vibration spikes and a cooling effect, an active perforation location and an inactive perforation location from a plurality of pre-determined perforation locations of the treatment well;
generate, during the fracturing operation and based at least on the active perforation local, a revised fracturing model for the subterranean formation;
perform, during the fracturing operation and based on the revised fracturing model, modeling of the fracturing operation to generate a performance metric;
decide, during the fracturing operation, to formulate a diversion pill operation for activation of the inactive perforation location based on a comparison of the performance metric to the maximum achievable performance metric;
generate, during the fracturing operation and based at least on the active perforation location, the inactive perforation location and the diversion pill operation, a projected fracturing model for the subterranean formation;
perform, during the fracturing operation, based on the projected fracturing model, modeling of the fracturing operation to generate a projected performance metric; and
decide, during the fracturing operation, to perform the diversion pill operation based on a comparison of the projected performance metric and one or more of the performance metric and the maximum achievable performance metric.

10. The one or more non-transitory computer-readable storage media of claim 9, wherein the fracturing model comprises a single-well template, a discrete fracture network and a three-dimensional mechanical earth model.

* * * * *